April 11, 1944.	R. F. STEWART ET AL	2,346,623
AUTOMATIC CONTROL FOR ELECTRIC CIRCUITS
Filed Jan. 22, 1942	3 Sheets-Sheet 1

Robert F. Stewart,
Paul W. Elrod, INVENTORS

BY
Victor J. Evans & Co.
ATTORNEYS

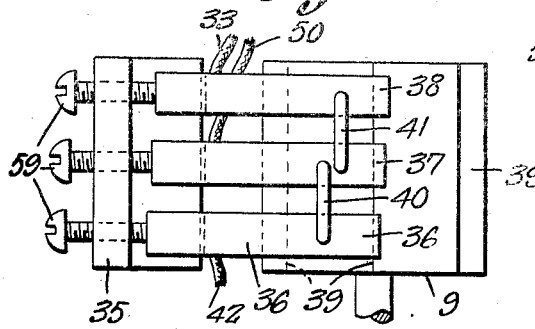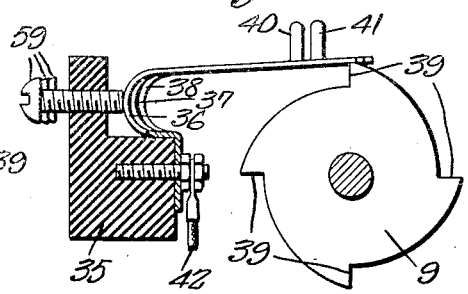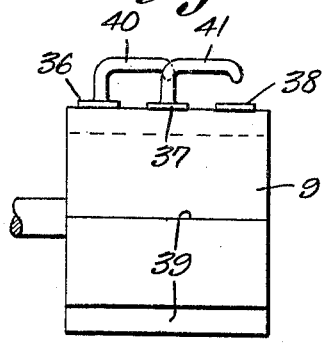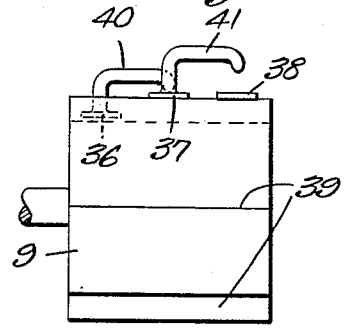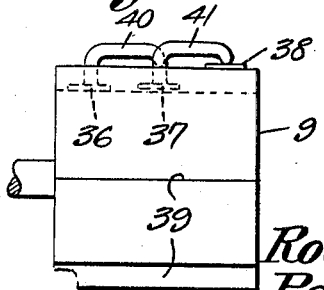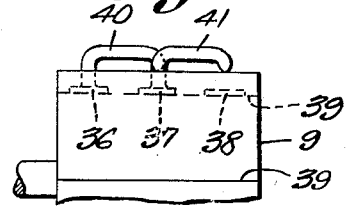

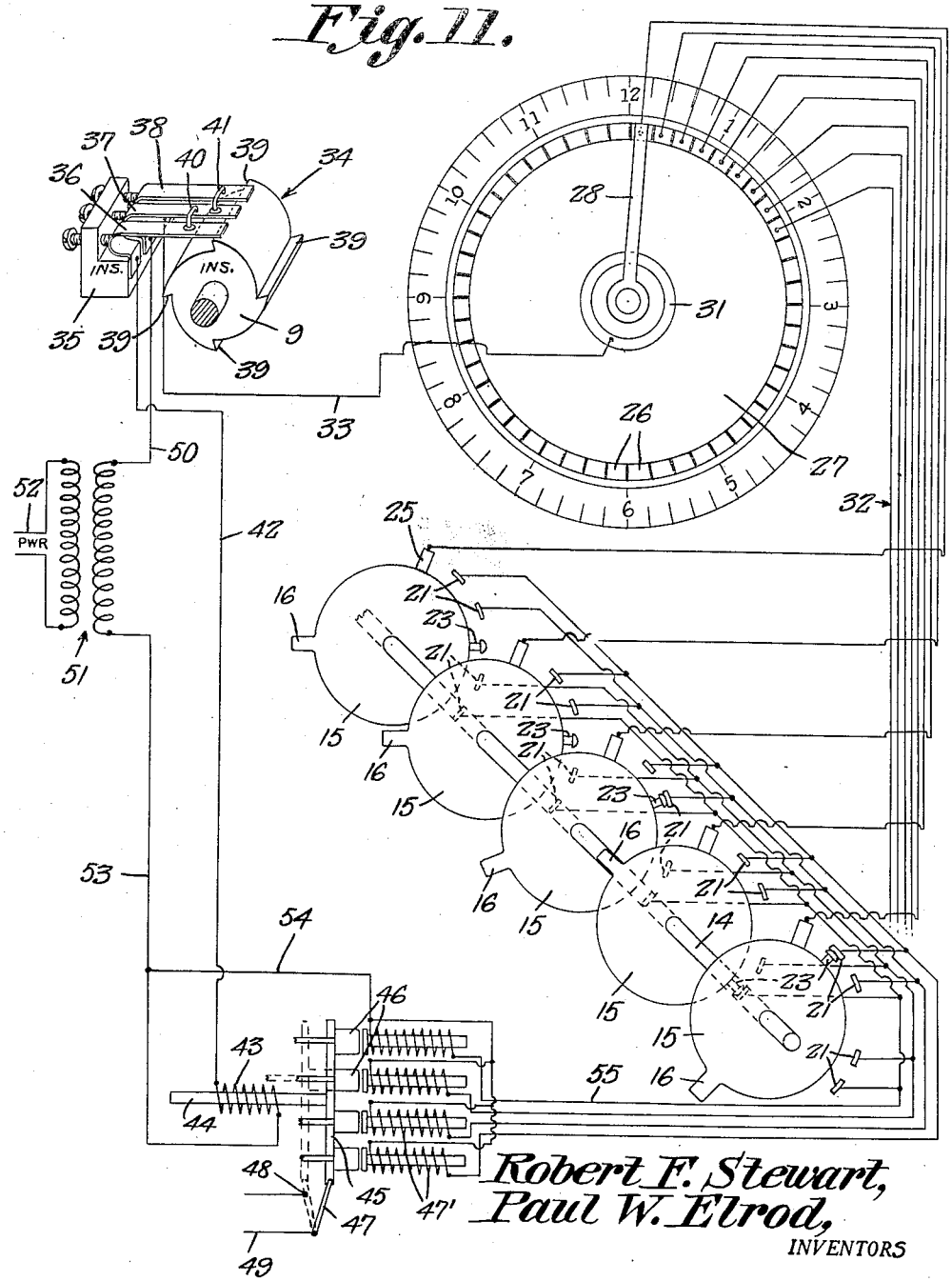

Patented Apr. 11, 1944

2,346,623

UNITED STATES PATENT OFFICE 2,346,623

AUTOMATIC CONTROL FOR ELECTRIC CIRCUITS

Robert F. Stewart and Paul W. Elrod, Franklin, Ohio; said Elrod assignor to Ohmer E. Stewart, Middletown, Ohio Application January 22, 1942, Serial No. 427,836

4 Claims. (Cl. 250—20)

This invention relates to automatic control for electric circuits and has for an object to provide apparatus of this character for controlling the predetermined timing for electrical devices, such as heating, timing, signaling, lighting devices without the use of tapes or ribbons.

An important field of application of the invention is in the remote control and program selection in the operation of radio receivers and this embodiment of the invention is chosen to illustrate the construction and operation.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 5 is a top plan view of the time controlled switch for controlling the power circuit and the tuning push buttons of a conventional push button control radio receiving set.

Figure 6 is a detail sectional view, with parts in elevation, of the switch shown in Figure 5.

Figures 7, 8, 9 and 10 are diagrammatic views showing different portions of the circuit controlling switch contacts of the switch shown in Figure 5.

Figure 11 is a wiring diagram showing the electrical connections of the various parts of the apparatus.

Figure 2:
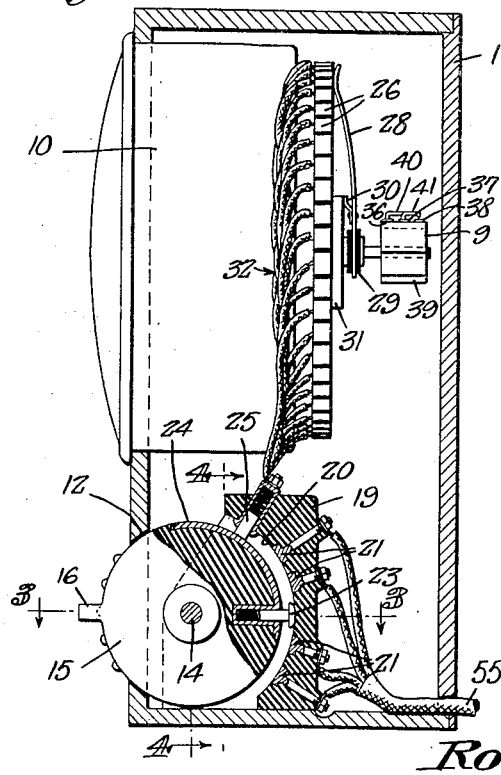
Figure 2 is a vertical sectional view taken on the line 2—2 of Figure 1 with parts in elevation.
Figure 3:
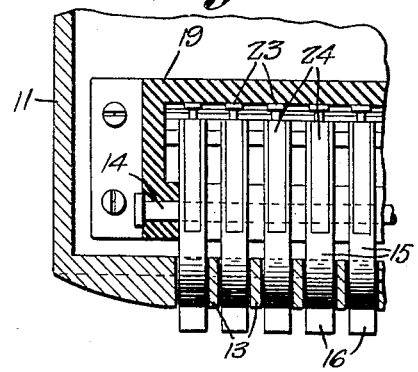
Figure 3 is a fragmentary horizontal sectional view taken on the line 3—3 of Figure 2.
Figure 4:
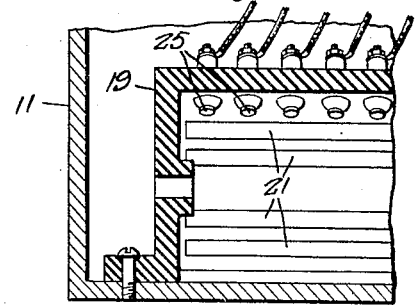
Figure 4 is a detail sectional view taken approximately on the line 4—4 of Figure 2.

Referring now to the drawings in which like characters of reference designate similar parts in the various views, 10 designates a clock which is mounted in a casing 11 having a plurality of vertical slots 12 in the front wall below the clock separated by partitions 13. A shaft 14, see Figure 2, is journaled in the end walls of the clock casing and is provided with a plurality of disks 15 loose thereon disposed in the slots, each having a projection 16 by means of which the disk may be rotated on the shaft. All of the disks are time selector disks for desired programs and each disk corresponds to a fifteen minute time period, and the time corresponding to each disk is designated by quarter hour division marks 17 on the clock casing, the hour division marks being designated by numerals 18 corresponding to the hours from one to twelve. There are forty-eight disks.

Figure 1:
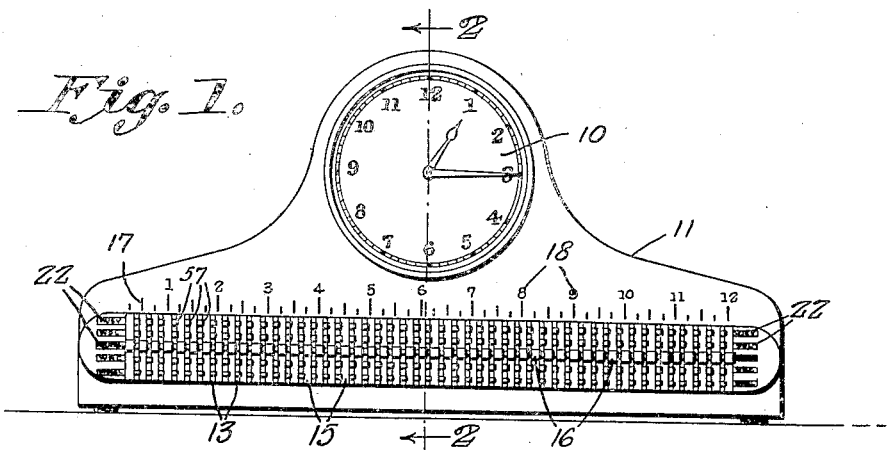
Figure 1 is a front elevation of a clock equipped with time selector disks and coacting switch mechanism corresponding to four radio broadcasting stations from which programs are desired to be heard at preselected times.

Back of the disks 15 a bar 19 of insulating material is disposed on the bottom of the clock casing and is provided with an arcuate front wall 20 into which is recessed a plurality of switch contact bars 21 of arcuate cross section, these bars extending longitudinally across all of the disks and corresponding to respective radio broadcasting stations, the identifying letters of which are marked on the clock casing in a vertical row at each end of the series of disks as indicated at 22 in Figure 1. In the present embodiment of the invention there are four broadcasting stations denoted by four respective bars 21.

Each disk is provided with a radially disposed spring pressed contact 23 adapted to be lodged on a respective bar when the disk is manually turned to select a broadcasting station. Each disk, which is formed of insulating material, is provided with an arcuate conductor 24 which is in electrical contact with the respective radial spring pressed contact 23 and is countersunk in the periphery of the respective disk. A spring pressed brush 25 is disposed obliquely in the bar 19 above each disk and has wiping engagement with the conductor 24 of the respective disk. The disks, bars, the contacts and the brushes constitute a station selector switch which may be manually closed by manipulation of the disks to select a desired station.

The time selector for the programs comprises a series of switch contacts 26 arranged concentric with the hour and minute hand arbors which are extended through the back of the clock, the segments being carried on the back face of a disk 27 of insulating material of which is secured to the back of the clock in any preferred manner. Each one of these contacts corresponds to a quarter hour time period so that the contacts are equivalent in number to the number of disks 15, that is forty-eight contacts. In the wiring diagram shown by Figure 11 the clock dial is shown diagrammatically and the markings on the dial are arranged to correspond to respective contacts 26.

A movable switch arm 28 is secured to the hour hand arbor and has wiping contact with the switch contacts 26, making one revolution every twelve hours. The switch arm is insulated from the arbor as shown at 29 in Figure 2 and is provided with a brush 30 which has wiping engagement with a conductor ring 31 which is mounted on the disk 27. Each one of the switch contacts 26 is connected by a circuit wire 32 to the brush 25 of a respective station selector disk 15. A conductor wire 33 connects the conductor ring 31 with a time controlled switch indicated at 34 in Figure 11 and shown in detail in Figures 5 to 10 inclusive.

The switch 34 may be called a power control switch and comprises a block 35 of insulation on which three leaf spring switch contacts 36, 37, 37 are secured at one end. The rotary member of the switch comprises a drum 9 having four transverse equally spaced teeth 39 upon which the free ends of the contacts 36 ride and then drop off during rotation of the drum to form circuit closers. The drum 9, see Figure 2, is formed of insulating material and is mounted on the minute hand arbor of the clock. The drum makes one revolution per hour so that the four teeth represent fifteen minute intervals of the hour and form circuit controllers each fifteen minutes of every hour.

It will be pointed out that the leaf spring switch contacts 36, 37 and 38 are of respectively different lengths, the contact 36 being shortest, the intermediate contact 37 being greater in length than the contact 36, and the contact 38 being longer in length than the intermediate contact. A hook shaped conductor 40 is secured to the short contact 36 and overlies the intermediate contact 37. A hook shaped conductor 41 is connected to the intermediate contact 37 and overlies the long contact 38. When the short contact drops off of a tooth the conductor 40 thereof will bridge the short contact and the intermediate contact and form a circuit controller until the intermediate contact drops off the same tooth during rotation of the drum. When the intermediate contact drops off the tooth the conductor 41 will bridge the intermediate contact and the long contact 38 and form a circuit controller until the long contact drops off of the tooth.

The short contact 36 of the switch 34 is connected by conductor wire 42 to a solenoid 43 the core 44 of which is secured to a bar 45 on the receiving set upon which bar the radio tuning push buttons 46 are located. Also this bar carries the movable arm 47 of a power switch which will be closed by contact of the arm with a fixed contact 48 in a circuit 49 of the radio to turn on the radio.

The intermediate spring switch contact 37 is connected by a conductor wire 50 to a step down transformer or low voltage transformer 51 which is operated from the service line 52. The other end of the transformer is connected by a conductor wire 53 to the other end of the solenoid 43.

A conductor wire 54 is connected to the wire 53 and is connected to one end of respective solenoids 47 for the push buttons 46 of the receiving set. The other ends of the solenoids are connected respectively by wires 55 to respective switch contact bars 21 corresponding to the broadcasting stations. There are four of the solenoids 47 in the present embodiment.

The operation of the switch 34 is only momentary and takes place at fifteen minutes time intervals. First the short spring switch contact 36 will drop down off one of the teeth 39 of the drum and its bridging conductor 40 will engage the intermediate contact 37 thereby energizing the solenoid 43 through the solenoid circuit which may be traced as the wire 50, wire 53, and wire 42. When the solenoid is energized the core 44 is drawn into it and the bar 45 is moved out to open the radio power switch and terminate a previous program if such a program be in operation. Next the intermediate leaf spring contact 40 will drop off the same tooth and thus engage its bridging conductor 41 with the long leaf spring contact 38 which later is connected to the wire 33 leading from the conductor ring 31 of the clock driven time selector disk 27. Thereupon, assuming that one of the programs selector disks 15 has been adjusted to bring its spring pressed contact 23 onto a respective switch contact bar 21 corresponding to a desired broadcasting station, a circuit is momentarily made for operating the respective radio tuning push button 46 which circuit may be traced as including the wire 33, conductor ring 31, brush 30, movable switch arm 28, respective contact segment 26, respective wire 32, respective brush 25, respective spring pressed contact 23, respective bar 21, respective wire 55, respective solenoid 47 and from the solenoid through the wire 54, wire 53, transformer 51, and wire 50. Thus said solenoid is energized to pull in its core 47' and push in a respective push button. The push button moves the bar 45 to close the radio power switch 47 and tunes in the selected program. Subsequently the long leaf spring contact 38 rides off the tooth and the circuit just traced is broken so that the selected program continues for fifteen minutes when again the cycle of operations takes place.

The partitions 13 between the selector disks 15 are provided with ribs 57, see Figure 2. The ribs are equal in number to the number of bars 21 corresponding to the broadcasting stations and also an additional rib which denotes a neutral space on the insulating bar 19, as also shown in Figure 2. The projection 16 on any selector disk 15 when brought into alignment with a predetermined rib 57 indicates that proper registration is being made between the spring pressed contact 23 of the disk and with one of the contact bars 21 or with the neutral space.

The leaf spring contacts 36, 37 and 38 are each provided at the rear end with an open loop 58 against which a respective adjusting screw 59 abuts to adjust the contacts relatively to each other and to the teeth of the drum.

Since the operation of the parts has been described as the description of the parts progressed it is thought that the invention will be fully understood without further explanation.

What is claimed is:

1. A program selector for a radio receiver comprising, an arcuate series of conductor bars representing different radio stations, selector disks having spring pressed contacts rotatable manually to engage the bars, an arcuate conductor fixed to the periphery of each disk in permanent contact with the spring pressed contact thereon, a brush contact pressed to engage each of said arcuate conductors, a time selector dial having mounted thereon an inner circular contact ring and an outer segmental circular series of contacts, circuit wires connecting the segmental contacts with the respective brush contacts, a rotary contact disposed to maintain contact with said ring and to successively engage the segmental contacts, a power controlling switch, a circuit maker and breaker, a conductor connecting said switch to said ring, clock mechanism for operating the rotary contact, the switch and the circuit maker and breaker, a source of electricity, solenoids operative to control a radio receiver and to open and close the switch, and conductors connected to the source of electricity, the solenoids, the circuit maker and breaker, and conductor bars, the arrangement being such that the circuit maker and breaker first operates to energize the switch solenoid to open the switch and terminate a program then energize a tuning button solenoid to tune in a predetermined program determined by the setting of a respective selector disk and simultaneously close the switch of the receiver to commence the selected program.

2. The structure as of claim 1 and in which the circuit maker and breaker comprises an insulating block, leaf spring contacts secured at one end to said block and respectively increasing in length, a clock actuated drum making one revolution each hour and provided with longitudinal teeth at spaced intervals corresponding to the moment of changing from one program to another, said teeth being preferably four in number and representing fifteen minute time periods, said leaf spring contacts preferably being three in number, a hook like conductor carried by the shortest contact adapted to bridge the intermediate contact when the short contact rides off one of the teeth of the drum, and a hook like conductor carried by the intermediate length leaf spring contact adapted to bridge the longest leaf spring contact when the intermediate length contact rides off of said tooth, the leaf spring contacts when bridged by the conductors forming circuit closers, the leaf spring contacts riding off of said rib at successive short time periods to open circuit position, the arrangement being such that the closed circuit position of the leaf spring contacts is only momentary to cause an impulse from a source of electricity to the various solenoids for terminating one program and commencing a new program.

3. The structure as of claim 1 and in which the selector disks and the segmental circular series of contacts are each forty-eight in number to represent fifteen minute time periods throughout a twelve hour broadcasting period.

4. The structure as of claim 1 and in which the clock operated contact is connected to an insulated disk and insulated from the hour hand arbor of the clock.

ROBERT F. STEWART.
PAUL W. ELROD.